United States Patent [19]
Hikmet

[11] Patent Number: 5,589,959
[45] Date of Patent: Dec. 31, 1996

[54] OPTICAL MODULATION DEVICE HAVING A POLYMER NETWORK CONTAINING FREE MOLECULES OF A CHIRAL LIQUID CRYSTALLINE MATERIAL

[75] Inventor: Rifat A. M. Hikmet, Eindhoven, Netherlands

[73] Assignee: U.S. Philips Corporation, New York, N.Y.

[21] Appl. No.: 534,772

[22] Filed: Sep. 28, 1995

Related U.S. Application Data

[63] Continuation of Ser. No. 113,546, Aug. 27, 1993, abandoned.

[30] Foreign Application Priority Data

Sep. 1, 1992 [EP] European Pat. Off. ............ 92202635

[51] Int. Cl.$^6$ ............................ G02F 1/1333; G02F 1/13
[52] U.S. Cl. ............................ 349/88; 349/89; 349/184
[58] Field of Search .................................. 359/51, 52, 56

[56] References Cited

U.S. PATENT DOCUMENTS

| | | | |
|---|---|---|---|
| 4,981,340 | 6/1991 | Kurematsu et al. | 350/333 |
| 5,056,898 | 10/1991 | Ma et al. | 359/94 |
| 5,188,760 | 2/1993 | Hikmet et al. | 252/299.01 |
| 5,194,973 | 3/1993 | Isogai et al. | 359/53 |
| 5,204,763 | 4/1993 | Hikmet | 359/51 |
| 5,206,747 | 4/1993 | Wiley et al. | 359/51 |
| 5,216,530 | 6/1993 | Pearlman et al. | 359/43 |
| 5,262,882 | 11/1993 | Hikmet | 359/75 |
| 5,303,073 | 4/1994 | Shirota et al. | 359/51 |
| 5,305,126 | 4/1994 | Kobayashi et al. | 359/52 |
| 5,321,533 | 6/1994 | Kumar | 359/51 |
| 5,333,074 | 7/1994 | Hikmet | 359/51 |
| 5,434,685 | 7/1995 | Pirs et al. | 359/51 |
| 5,490,001 | 2/1996 | Konuma | 359/56 |

FOREIGN PATENT DOCUMENTS

| | | |
|---|---|---|
| 0269062 | 6/1988 | European Pat. Off. . |
| 0313053 | 4/1989 | European Pat. Off. . |
| 0406705 | 1/1991 | European Pat. Off. . |
| 0451905 | 10/1991 | European Pat. Off. . |
| 0506176 | 9/1992 | European Pat. Off. . |
| 62-260841 | 11/1987 | Japan . |
| 1142713 | 6/1989 | Japan .................................. 359/51 |
| 4029219 | 1/1992 | Japan . |
| 9204421 | 3/1992 | WIPO . |

OTHER PUBLICATIONS

"Ferroelectric Liquid Crystal Displays for Television Application" Ferroelectronics, 1991, vol. 122, pp. 1–26 Wilbert J. A. M. Hartmann.

Primary Examiner—William L. Sikes
Assistant Examiner—Charles Miller
Attorney, Agent, or Firm—Michael E. Schmitt

[57] ABSTRACT

An optical modulation device is described, which comprises two substrates, which are provided with at least one electrode, and an optically active layer situated between said two substrates, the optically active layer comprising a liquid crystalline material having ferroelectric, antiferroelectric or electroclinic properties. In accordance with the invention, the device is characterized in that the optically active layer comprises a permanently oriented anisotropic network of polymerized material containing free molecules of a chiral liquid crystalline material. Said network is preferably composed of a polymer formed from reactive monomers comprising at least two reactive groups on the basis of acrylates, methacrylates, epoxy compounds and/or thiolene systems. By means of such an optical modulation device grey levels which can be passively maintained for a relatively long period of time can be obtained in a relatively simple manner. In addition, the device in accordance with the invention is little sensitive to shocks. Besides, the device in accordance with the invention can be constructed so as to comprise a relatively thick optically active layer, without the occurrence of a disturbing loss of contrast caused by "chevrons".

7 Claims, 4 Drawing Sheets

OPTICAL MODULATION DEVICE HAVING A POLYMER NETWORK CONTAINING FREE MOLECULES OF A CHIRAL LIQUID CRYSTALLINE MATERIAL

This is a continuation of patent application Ser. No. 08/113,546, filed Aug. 27, 1993, now abandoned.

BACKGROUND OF THE INVENTION

The invention relates to an optical modulation device comprising two substrates, which are provided with at least one electrode, and an optically active layer which is located between said two substrates, the optically active layer comprising a liquid crystalline material having ferroelectric, antiferroelectric or electroclinic properties. The invention also relates to a modulation device in the form of a display device. Said modulation devices can be used in electro-optic light shutters, for example for optical printers, and in drivable optical filters and splitters.

An optical modulation device of the type mentioned in the opening paragraph is known per se from, for example, European Patent Appliction EP-A 406705. The display device or display described therein comprises two parallel transparent glass substrates which are provided with a matrix of transparent electrodes of, for example, indium-tin-oxide (ITO) on the sides facing each other. An orientation layer of, for example, rubbed polyimide is provided on said electrodes. The substrates are positioned with respect to each other by means of spacers, for example, in the form of optical fibres having a specific diameter. An optically active layer of liquid crystalline material is present between both substrates.

At the operating temperature of the device the liquid crystalline material is in the so-called chiral smectic C-phase (Sc*-phase). In this state the material exhibits ferroelectric properties such as spontaneous polarization. If the optically active layer is sufficiently thin all chiral liquid crystalline molecules are oriented by the orientation layers in such a way that they extend parallel to the substrate surfaces. Under said conditions the direction of polarization of the liquid crystalline molecules is substantially transverse to the substrate surfaces. Via the electrodes, an electric field can be applied transversely across the optically active layer. As a result, all chiral liquid crystalline molecules are polarized in the same direction. The direction of polarization can be reversed by means of an oppositely directed field. In the absence of an external magnetic or electric field an adjusted direction of polarization is maintained for a relatively long period of time. Thus, such a ferroelectric modulator exhibits bistability.

Polarizers having mutually crossed directions of polarization can be provided on the surfaces of the substrates facing away from each other. Such a device can be used as an electro-optic display device, in which the optical transparency of the various pixels can be switched by means of an electric field.

Such ferroelectric modulation devices have important advantages over the more widely known optical modulation devices comprising chiral liquid crystalline materials of the so-called TN-type (twisted nematic). The operation of the latter devices is based on changes in the orientation of the molecules of the liquid crystalline material in the nematic phase as a result of the application of an electric field. Due to the relatively long relaxation time of the liquid crystalline molecules after the field has been discontinued, such modulation devices have an intrinsically relatively long response time of the order of tens of milliseconds. In contrast, the operation of ferroelectric modulation devices is based on changes of the polarization direction of the molecules of the liquid crystalline material in the chiral smectic phase as a result of the application of an electric field. Said changes are intrinsically relatively fast. Consequently, ferroelectric modulation devices have a typical response time of a few microseconds. A further advantage of ferroelectric modulators is that, in comparison with TN modulators, the image contrast is governed less by the viewing angle.

However, state-of-the-an ferroelectric optical modulation devices have a number of important disadvantages. One such disadvantage relates to providing and maintaining grey levels. It is known per se that such grey levels can be obtained by rapid modulation of the applied electric field. However, when this field is removed the adjusted grey level disappears soon. Thus, the use of the known modulators does not allow adjusted grey levels to be "passively" maintained for a relatively long period of time. Further, it is known from "Ferroelectrics", vol. 121, pp. 1–29 (1991) that by means of specific texturing processes grey levels can be obtained which, in the absence of an electric or magnetic field, are maintained for a relatively long period of time. In practice it has been found however that such texturing processes are very expensive and difficult to realise, while the reproducibility of the grey levels obtained leaves much to be desired. A further important disadvantage of the known ferroelectric modulators is their sensitivity to shocks, which was found to be relatively high. It is an object of the invention to overcome the above-mentioned disadvantages. The invention more particularly aims at providing an optical modulation device of relatively simple construction, which enables grey levels to be realised which are maintained in the absence of an electric field. In addition, the modulation device in accordance with the invention must have a relatively low sensitivity to shocks.

SUMMARY OF THE INVENTION

These and other objects of the invention are attained by an optical modulation device of the type described in the opening paragraph, which is characterized according to the invention in that the optically active layer comprises a permanently oriented anisotropic network of polymerized material containing free molecules of a chiral liquid crystalline material.

The optically active layer of the modulation device in accordance with the invention is manufactured as follows. A liquid crystalline mixture of polymerizable monomers of a liquid crystalline material and non-reactive molecules of a chiral liquid crystalline material is provided between the substrates of a modulation device. The liquid crystalline material is chosen to be such that, at the service temperature of the device, said mixture is in a liquid crystalline state exhibiting ferroelectric, antiferroelectric or electroclinic properties. Subsequently, the device is brought to a temperature at which the liquid crystalline material is, for example, in the nematic, smectic C or smectic A phase. Under said conditions the material is, for example, uniaxially oriented by means of orientation layers. Subsequently, the reactive monomers are polymerized to form a three-dimensional network. Said network contains the non-reactive molecules of the chiral liquid crystalline material. Due to the uniaxial orientation of said chiral molecules an anisotropic network is obtained after polymerization. Therefore, the optically active layer of the modulation device in accordance with the invention consists of a gel which comprises free, non-reactive chiral liquid crystalline molecules which are trapped, so to speak, in an anisotropic three-dimensional polymer network.

It is noted that orientations other than the above uniaxial orientations can be realised. For example, "twisted", "supertwisted" and "tilted" structures can be provided in the optically active material by a proper choice of the orientation directions of the orientation layers, the optically active material and the thickness of the cell.

It has been found that by using the modulation device in accordance with the invention grey levels can be obtained which are maintained in the absence of an electric field. The exact working mechanism of the molecules in the optical layer is not known. It is assumed that the free chiral liquid crystalline molecules are subject to interactions with the network so that also dipole orientations in the range between both extreme dipole orientations are stabilized as a result of an external electric field. It is also possible that the network stabilizes small nearby domains having mutually opposed directions of polarization for a relatively long period of time.

Further it has been found that the modulation devices in accordance with the present invention are much less sensitive to shocks than the known ferroelectric modulators. Possibly said improved sensitivity to shocks can be attributed to the extra stabilizing effect of the network on the orientation of the free chiral molecules.

The optical modulator in accordance with the invention also provides a number of other important advantages which cannot be attained with the known modulators. For example, hitherto the layer thickness of the optical layer in the known devices had to be relatively small, i.e. maximally 2 micrometers. At larger layer thicknesses the problem of the so-called "chevron-formation" becomes unacceptably large. Said formation involves a reduction of the brightness contrast of the modulator. Said limitation of the thickness of the optically active layer imposes high technical requirements on the manufacture of this type of modulation devices. Owing to said limitation, the production technology of the modulation devices based on the TN-effect cannot be used as in said devices layer thicknesses of minimally 3 micrometers are customarily used. In the active layer of the modulator in accordance with the invention the problem of chevron-formation occurs to a much lesser extent. This permits modulation devices to be manufactured in which the active layer has a thickness of 6 micrometers, without an appreciably contrast reduction caused by chevron-formation.

Another advantage of the inventive modulation device relates to the orientation layers. Due to the use of an anisotropic network in the active layer of the optical modulation device in accordance with the invention, the presence of orientation layers during operation of the device is, in principle, superfluous. In fact, the chiral liquid crystalline molecules in the active layer of the inventive device are oriented by the anisotropic network. Said network keeps the free chiral molecules oriented during operation of the device. However, the orientation layers are preferably present in the device to enable the free, non-reactive liquid crystalline molecules to be oriented in a simple manner during the polymerization of the anisotropic network. However, for this purpose an external electric or magnetic field can alternatively be used. In the latter case orientation layers can be omitted.

A preferred embodiment of the modulation device in accordance with the invention is characterized in that 5 to 60 wt. % of the active layer consists of an anisotropic network. It has been found that in the case of a quantity of anisotropic network below 5 wt. %, an unacceptably high degree of chevron-formation occurs at thicknesses of the active layer in excess of 4 micrometers. A quantity of anisotropic network in excess of 60 wt. % leads to a substantial increase of the switching time of the device. The best active layers comprise 10 to 50 wt. % of anisotropic network. It is noted that the quantity of anisotropic network is calculated as the ratio between the weighed-in quantity of reactive monomers from which the network is formed after polymerization and the weighed-in quantity of non-reactive chiral liquid crystalline material present in the optically active layer as free molecules after polymerization.

A further preferred embodiment of the inventive optical modulation device is characterized in that the network is composed of a polymer which is formed from reactive monomers having at least two reactive groups on the basis of acrylates, methacrylates, epoxy compounds and/or thiolene systems. Said reactive monomers can be polymerized in a simple manner by means of actinic radiation in the presence of a photo-initiator. Actinic radiation is to be understood to mean herein radiation with light, in particular UV light, X-rays, gamma-rays or radiation with high-energy particles such as electrons and ions. In the polymerization of the above-mentioned monomers no low-molecular by-products are formed which might adversely affect the optical properties of the modulation device. Examples of the composition of such networks are described in EP-A 451905. It is noted that such networks can alternatively be formed by thermal polymerization of the above-described reactive monomers.

In accordance with a further preferred embodiment of the invention, the free molecules of the chiral liquid crystalline material in the active layer comprise one or more than one of the compounds in accordance with formulae F1–F7 of the formula sheet (FIG. 4), where R and R1 denote a non-reactive alkyl residue which may or may not be substituted. Said compounds are in the Sc* phase in the temperature range in which the modulation device in accordance with the invention is operated, i.e. in the range from −10° C. to +60° C.

Another advantageous embodiment of the device in accordance with the invention is characterized in that the chiral liquid crystalline material of the optically active layer comprises free molecules having dichroic properties. This has the advantage that in the optical modulator in accordance with the invention only one polarizer has to be used. Examples of such dichroic molecules are described in European Patent Application EP-A 269062.

An interesting embodiment of the modulation device in accordance with the invention is characterized in that the anisotropic network and the free molecules of the chiral liquid crystalline material exhibit dichroic properties. In this case, not a single polarizer has to be used in the device. Formula F8 of the formula sheet (FIG. 4) shows an example of a reactive monomer having dichroic properties, which monomer can be taken up by the network in a relatively small quantity during polymerization. Said dichroic monomers may have one or more than one reactive groups.

BRIEF DESCRIPTION OF THE DRAWINGS

The invention will be explained in greater detail by means of exemplary embodiments and the drawing, in which.

For clarity, various pans of the Figure are not drawn to scale.

DETAILED DESCRIPTION OF THE PREFERRED EMBODIMENTS

Figure 1:
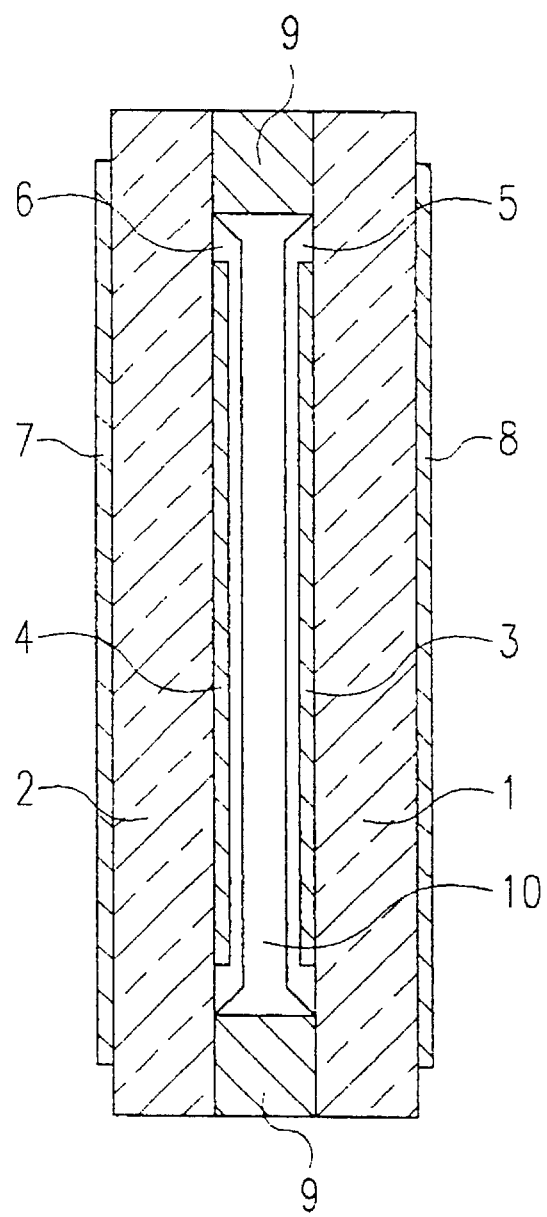
FIG. 1 shows a ferroelectric optical modulation device

FIG. 1 is a diagrammatic sectional view of a ferroelectric optical modulation device in accordance with the invention, in the form of an electro-optical light shutter. Said shutter comprises two parallel, circular glass substrates (1, 2) which are transparent to light. On the facing surfaces of the substrates there are provided electrode layers (3, 4), for example of ITO, which are also transparent to the light for which the modulation device is used. Orientation layers (5, 6) of rubbed polyimide are provided on the electrode layers, in such a manner that both layers are rubbed parallel to each other and in the same direction. On the sides facing away from each other the substrates are provided with a polarizer (7, 8). Both polarizers are polarized in mutually crossed directions. A fixed interval of 6 micrometers between the facing surfaces of the orientation layers is maintained by means of a spacer (9). An optically active layer (10) is situated between the orientation layers.

The optical modulator of FIG. 1 was filled with a liquid crystalline mixture of reactive polymerizable monomers on the basis of diacrylates having the structural formula shown in formula F9 of the formula sheet (20 wt. %) and non-reactive chiral liquid crystalline material Zli 3654 (Merck; 80 wt. %). A quantity of 0.5 wt. % of the photo-initiator Igacure 651 (Merck) was added to this mixture. The filled cell was subsequently brought to a temperature of 80° C., at which temperature the mixture was in the nematic phase, and was oriented due to the presence of the orientation layers. Under said conditions a uniaxial orientation of the liquid crystalline molecules was obtained. Subsequently, the reactive monomers were polymerized by means of UV light to form an anisotropic network. An optically active layer having ferroelectric properties was obtained by cooling to the service temperature (25° C.) of the optical shutter.

Figure 2A:
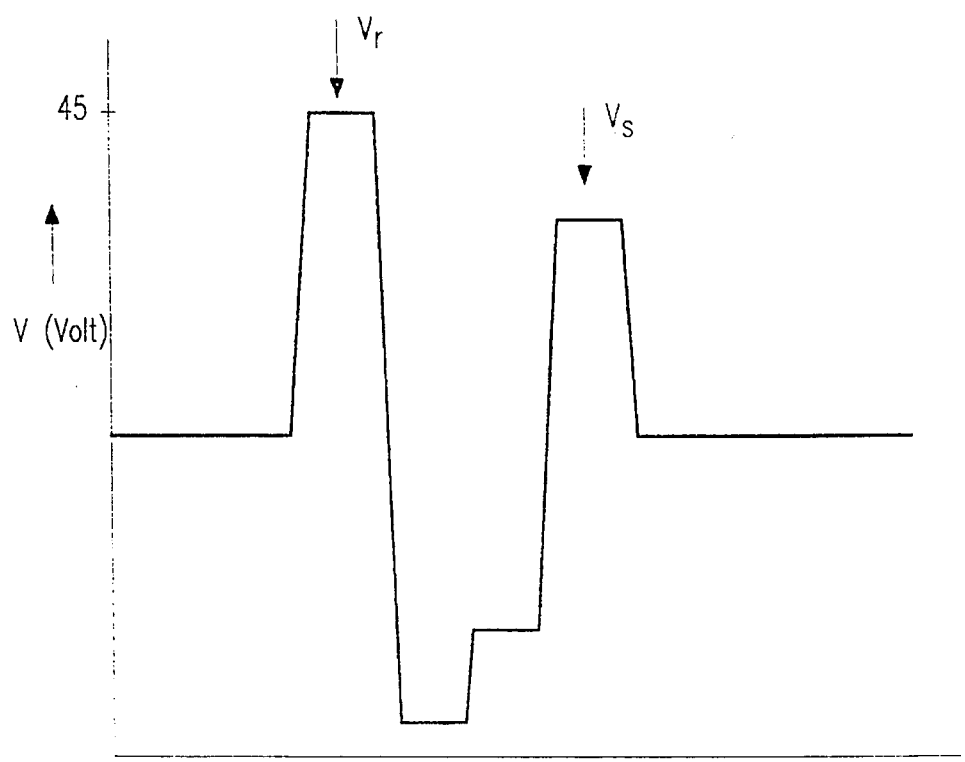
FIGS. 2A and 2B show the transmission (grey level) and the pulse sequence as a function of time of the device shown in FIG. 1
Figure 2B:
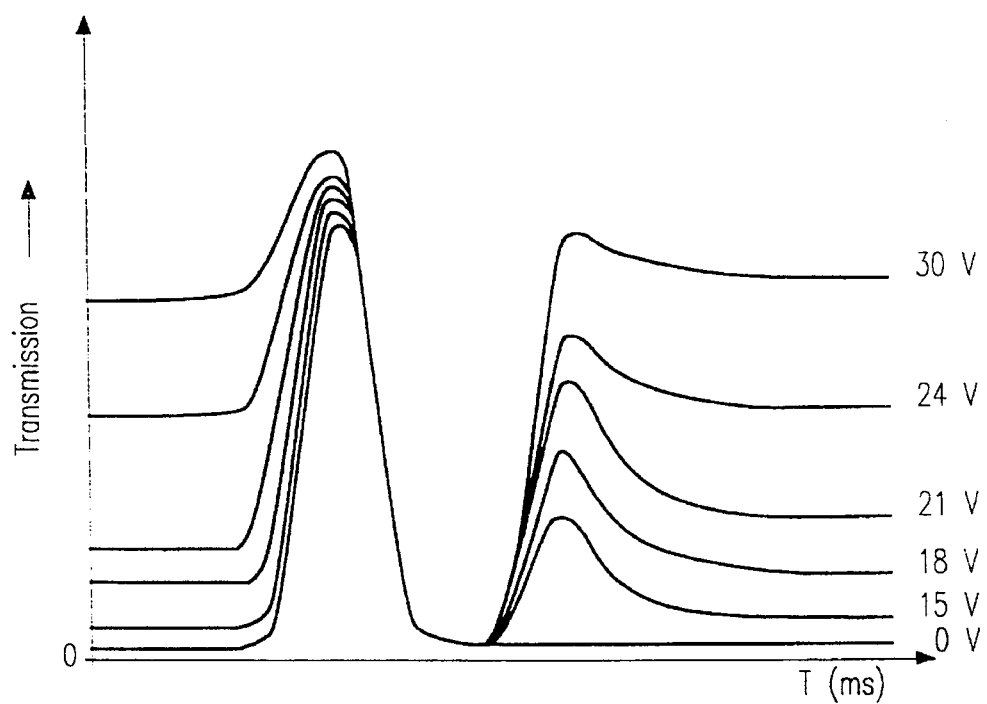

The above-described electro-optic light shutter was subjected to a number of measurements regarding the adjustability and quality of grey levels. FIG. 2-A shows a characteristic curve as a function of time of the voltage applied to the electrode layers of the light shutter. After an initial reset pulse $V_r$ having a maximum amplitude of 45 Volts, a selector pulse $V_s$ lasting 60 microseconds and having any value in the range between 0 and 45 Volts was applied across the electrode layers of the shutter, after which the voltage was reduced to 0 Volt. The applied selector pulse had a value of 0, −15, −18, −21, −24 and −30 Volts. For the pulse sequence shown in FIG. 2-A use was made of a selector pulse of 30 V. The pulse sequence was repeated very many times with a frequency of 30 milliseconds.

FIG. 2-B shows the transmission variation as a result of said voltage-pulse sequence, measured on the same time scale as indicated in FIG. 1-A. The grey level of the optical modulator could be adjusted as a function of the value of the selector pulse. If the pulse sequence was interrupted immediately after the selector pulse had been produced, it was found that the grey level thus adjusted was maintained for a relatively long period of time, i.e. for at least 60 minutes. The grey level was not affected by shocks to which the optical shutter was subjected.

Figure 3A:
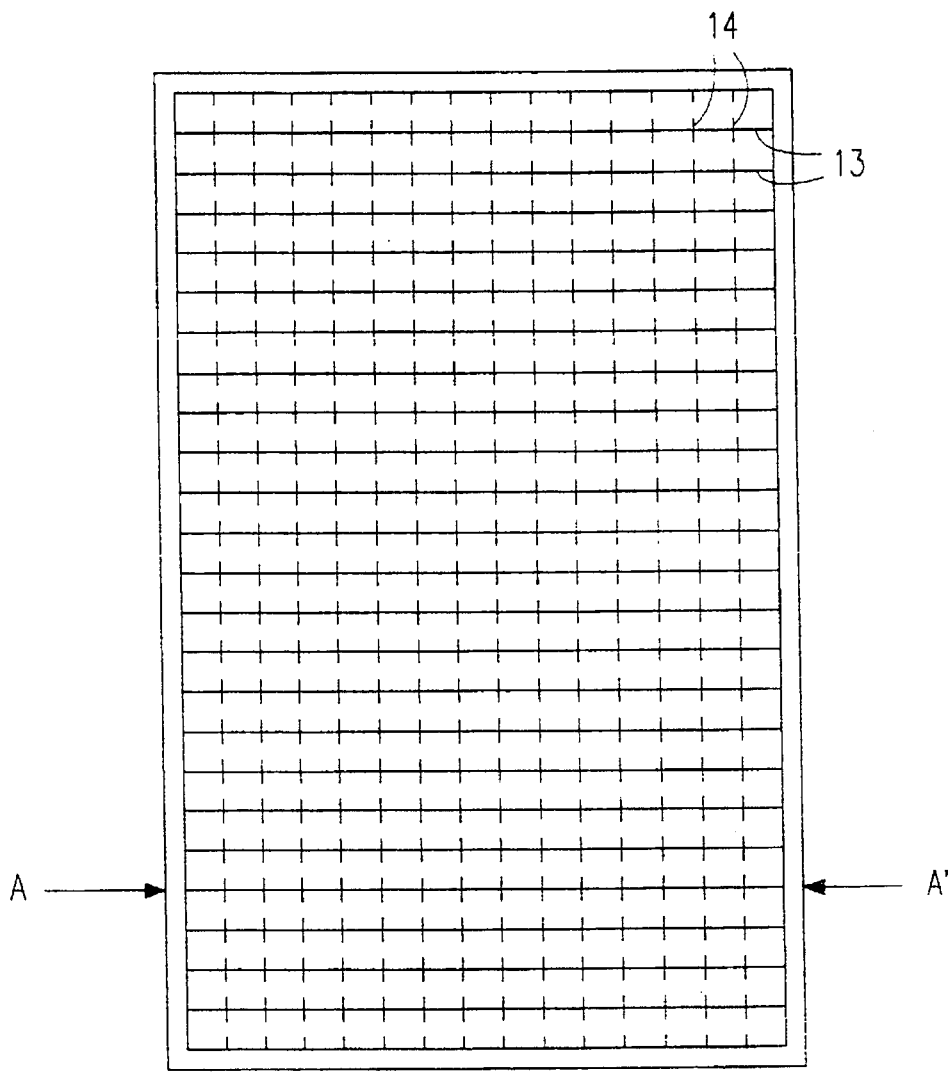
FIGS. 3A and 3B diagrammatically show an optical modulation device in accordance with the invention, in the form of a display device.
Figure 3B:
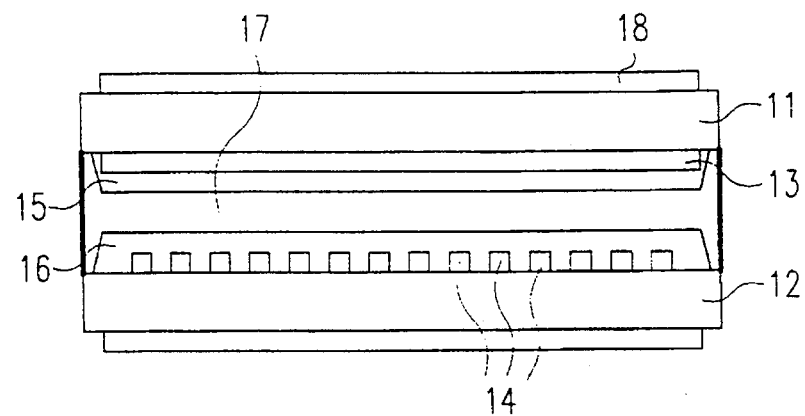
Figure 4:
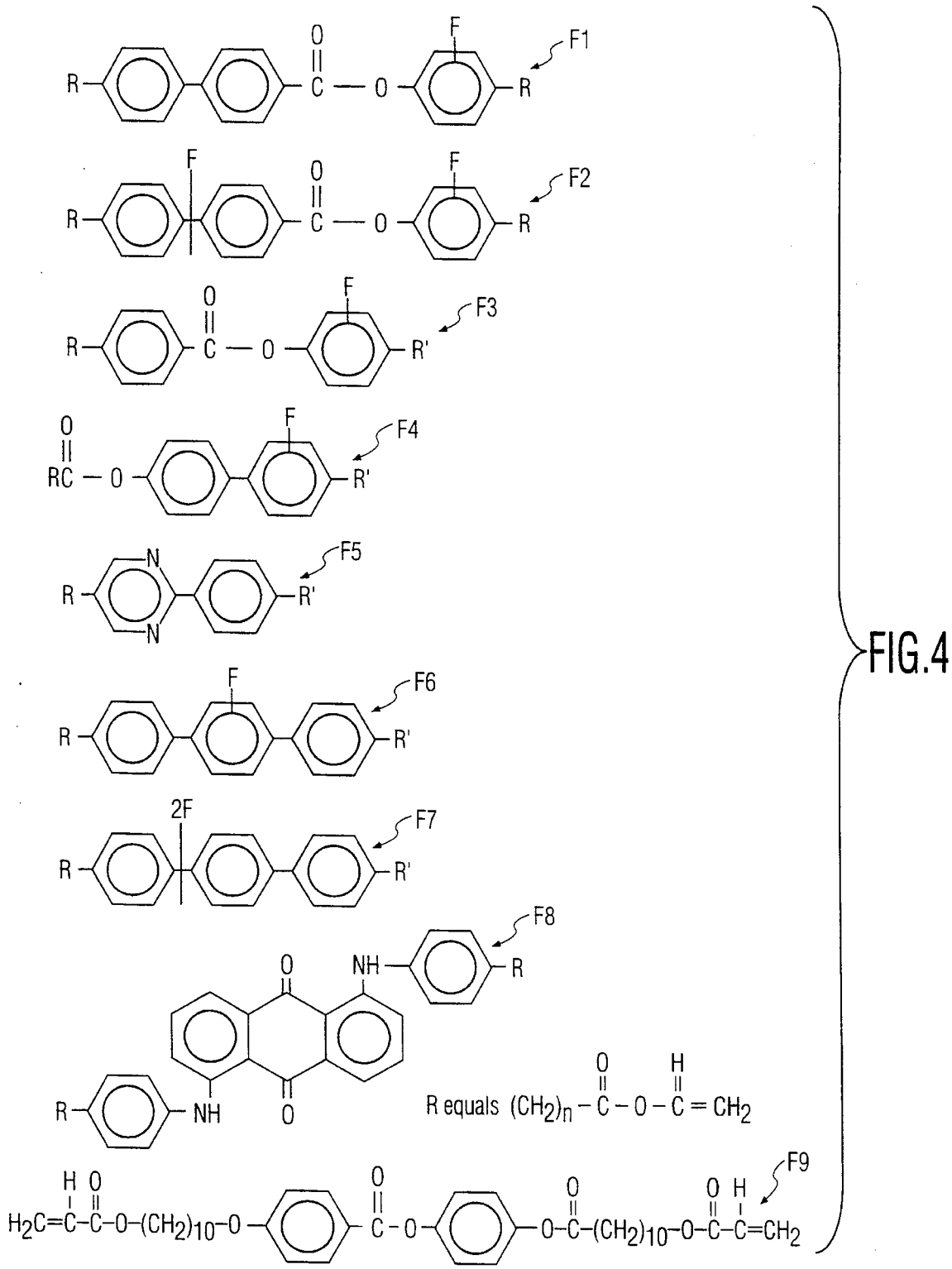
FIG. 4 is a formula sheet containing the chemical formulas of materials suitable for use with the invention.

FIG. 3 diagrammatically shows a ferroelectric optical light modulator in accordance with the invention, which is configured as a display device. FIG. 3-A is a top view of the device. FIG. 3-B is a sectional view of the device, taken on the line A-A' of FIG. 3-A. The display device comprises two glass substrates (11, 12) which are provided with a matrix of transparent electrode layers (13, 14) on the sides facing each other. Said electrode layers can be individually driven via electrically conductive tracks (not shown). On the matrix of the electrode layer there is provided an orientation layer (15, 16) of rubbed polyimide. The distance between both orientation layers is 3.6 micrometers. Said distance forms the thickness of the optical active layer (17).

The display device of FIG. 3 was filled with a mixture of reactive polymerizable monomers on the basis of diacrylates having the above-mentioned structural formula (30 wt. %) and non-reactive chiral liquid crystalline material Zli 3654 (Merck) (70 wt. %). A quantity of 0.4 wt. % of the photo-initiator Igacure 651 (Merck) was added to this mixture. The filled cell was subsequently brought to a temperature of 90° C., at which temperature the mixture was in a smectic phase and the liquid crystalline parts of the molecules were oriented towards the orientation layers (18, 19) which had the same direction of rubbing, after which said cell was oriented by means of an electric field. Under said conditions a uniaxial orientation of the liquid crystalline molecules was obtained. Subsequently, the reactive monomers were polymerized to form an anisotropic network by means of actinic radiation such as UV light. By cooling to room temperature a display device was obtained having an optically active layer with ferroelectric properties. It is noted that the above-described passive matrix display can also be configured as an active matrix display.

It was found that, despite the relatively large thickness of the optically active layer, the reduction of the brightness contrast as a result of chevron-formation was relatively small. Further, it was found that in the inventive display device adjusted grey levels can be maintained for a relatively long period of time. Also the sensitivity to shocks of the device was relatively small.

I claim:

1. A shock resistant optical modulation device capable of passively maintaining gray levels, comprising:

two substrates, at least one electrode on each substrate, and an optically active layer located between said two substrates, the optically active layer comprising a liquid crystalline material having ferroelectric, anti-ferroelectric or electroclinic properties, and a permanently oriented anistropic network of polymerized material containing free molecules of a chiral liquid crystalline material.

2. A modulation device as claimed in claim 1, characterized in that 5 to 60 wt. % of the active layer consists of an anisotropic network.

3. A modulation device as claimed in claim 1, characterized in that the network is composed of a polymer formed from reactive monomers having at least two reactive groups on the basis of acrylates, methacrylates, epoxy compounds and/or thiolene systems.

4. A modulation device as claimed in claim 1, in which the free molecules of the chiral liquid crystalline material in the active layer comprise one or more than one of the compounds of the formula

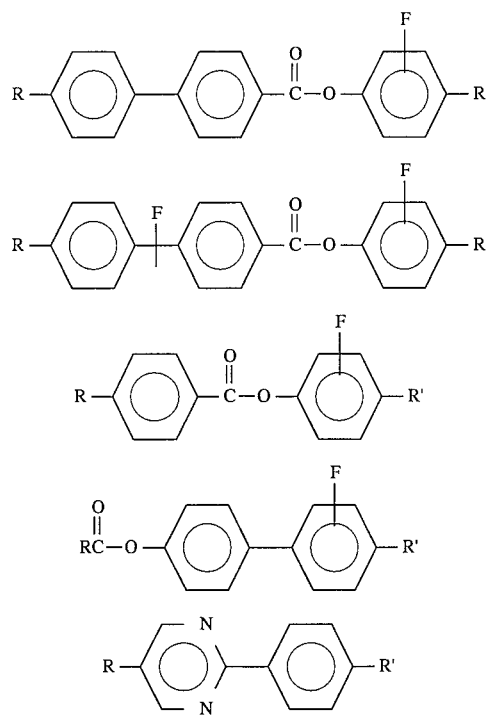

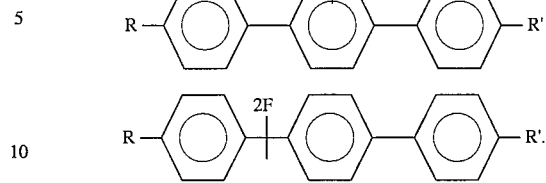

5. A modulation device as claimed in claim 1, characterized in that the chiral liquid crystalline material comprises free molecules having dichroic properties.

6. A modulation device as claimed in claim 1, characterized in that the anisotropic network and the free molecules of the chiral liquid crystalline material exhibit dichroic properties.

7. A modulation device as claimed in claim 1, in the form of a display device, comprising two substrates which are provided with a number of electrodes and an optically active layer which is located between said two substrates.

* * * * *